United States Patent
Setter et al.

(10) Patent No.: US 10,990,489 B2
(45) Date of Patent: Apr. 27, 2021

(54) REPLICATION SYSTEM WITH NETWORK FAILOVER

(71) Applicant: Amazon Technologies, Inc., Seattle, WA (US)

(72) Inventors: Ophir Setter, Ramat Gan (IL); Roman Zeyde, Afula (IL); Sigal Weiner, Holon (IL); Leonid Feinberg, Ramat Ha'Sharon (IL); Ofir Ehrlich, Netanya (IL)

(73) Assignee: Amazon Technologies, Inc., Seattle, WA (US)

( * ) Notice: Subject to any disclaimer, the term of this patent is extended or adjusted under 35 U.S.C. 154(b) by 16 days.

(21) Appl. No.: 16/204,264

(22) Filed: Nov. 29, 2018

(65) Prior Publication Data

US 2019/0205227 A1    Jul. 4, 2019

Related U.S. Application Data

(60) Provisional application No. 62/611,335, filed on Dec. 28, 2017.

(51) Int. Cl.
| | | |
|---|---|---|
| *G06F 11/00* | (2006.01) | |
| *G06F 11/20* | (2006.01) | |
| *G06F 11/14* | (2006.01) | |
| *H04L 29/08* | (2006.01) | |
| *H04L 12/24* | (2006.01) | |
| *H04L 12/26* | (2006.01) | |

(52) U.S. Cl.
CPC ...... *G06F 11/2069* (2013.01); *G06F 11/1435* (2013.01); *G06F 11/1443* (2013.01); *G06F 11/2025* (2013.01); *G06F 11/2082* (2013.01); *G06F 11/2092* (2013.01); *H04L 29/08* (2013.01); *H04L 41/046* (2013.01); *H04L 41/0663* (2013.01); *H04L 43/0811* (2013.01); *H04L 67/2842* (2013.01); *G06F 2201/84* (2013.01)

(58) Field of Classification Search
CPC ........... G06F 11/2074; G06F 2201/855; G06F 11/2082; G06F 11/2076; G06F 11/2089
See application file for complete search history.

(56) References Cited

U.S. PATENT DOCUMENTS

| | | | |
|---|---|---|---|
| 7,055,057 B2 | 5/2006 | Achiwa | |
| 7,058,731 B2 | 6/2006 | Kodama et al. | |
| 9,298,728 B2 | 3/2016 | Mcalister et al. | |
| 2013/0103650 A1* | 4/2013 | Natanzon | G06F 11/2069 707/684 |
| 2014/0047263 A1* | 2/2014 | Coatney | G06F 11/20 714/4.11 |
| 2014/0365816 A1* | 12/2014 | Antony | G06F 11/2046 714/6.11 |

* cited by examiner

*Primary Examiner* — Charles Ehne
(74) *Attorney, Agent, or Firm* — Nicholson De Vos Webster & Elliott, LLP

(57) ABSTRACT

A system and method for disk replication over a network with network failover, the method including: generating at least one write packet when a write instruction is detected from a first computing environment, where the at least one write packet includes: metadata associated with a data block, and a packet identifier; storing the at least one write packet in a cache; sending the at least one write packet from the cache to a second computing environment for storage; and determining if the at least one write packet has been successfully stored in the second computing environment.

15 Claims, 4 Drawing Sheets

REPLICATION SYSTEM WITH NETWORK FAILOVER

CROSS-REFERENCE TO RELATED APPLICATIONS

This application claims the benefit of U.S. Provisional Application No. 62/611,335 filed on Dec. 28, 2017, the contents of which are hereby incorporated by reference.

TECHNICAL FIELD

The present disclosure relates generally to replication systems and particularly to network failovers in replication systems.

BACKGROUND

Replication and backup methods for servers, hardware, and software systems are essential tools in ensuring operability when an original computing or storage device or system, or the like, fails, as technology is prone to do after some period of time. For example, an original device may be replicated by sending the contents of the device to an identical machine at a secondary location so that in a scenario where the original device at a first location experiences issues, such as loss of connectivity, disk failure, and the like, a backup version of the contents remains accessible. In order to replicate content from one device to another, multiple packets of data must be transferred to the replication system, e.g., over an internal or external network. However, the networks themselves may not always be reliable, and therefore it would be beneficial to provide a solution which takes into account network communication failures and provides a failover solution.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for disk replication over a network with network failover, the method including: generating at least one write packet when a write instruction is detected from a first computing environment, where the at least one write packet includes: metadata associated with a data block, and a packet identifier; storing the at least one write packet in a cache; sending the at least one write packet from the cache to a second computing environment for storage; and determining if the at least one write packet has been successfully stored in the second computing environment.

Certain embodiments disclosed herein also include a non-transitory computer readable medium having stored thereon instructions for causing a processing circuitry to perform a process, the process including: generating at least one write packet when a write instruction is detected from a first computing environment, where the at least one write packet includes: metadata associated with a data block, and a packet identifier; storing the at least one write packet in a cache; sending the at least one write packet from the cache to a second computing environment for storage; and determining if the at least one write packet has been successfully stored in the second computing environment.

Certain embodiments disclosed herein also include a system for disk replication over a network with network failover, the system including: a processing circuitry; and a memory, the memory containing instructions that, when executed by the processing circuitry, configure the system to: generate at least one write packet when a write instruction is detected from a first computing environment, where the at least one write packet includes: metadata associated with a data block, and a packet identifier; store the at least one write packet in a cache; send the at least one write packet from the cache to a second computing environment for storage; and determine if the at least one write packet has been successfully stored in the second computing environment.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
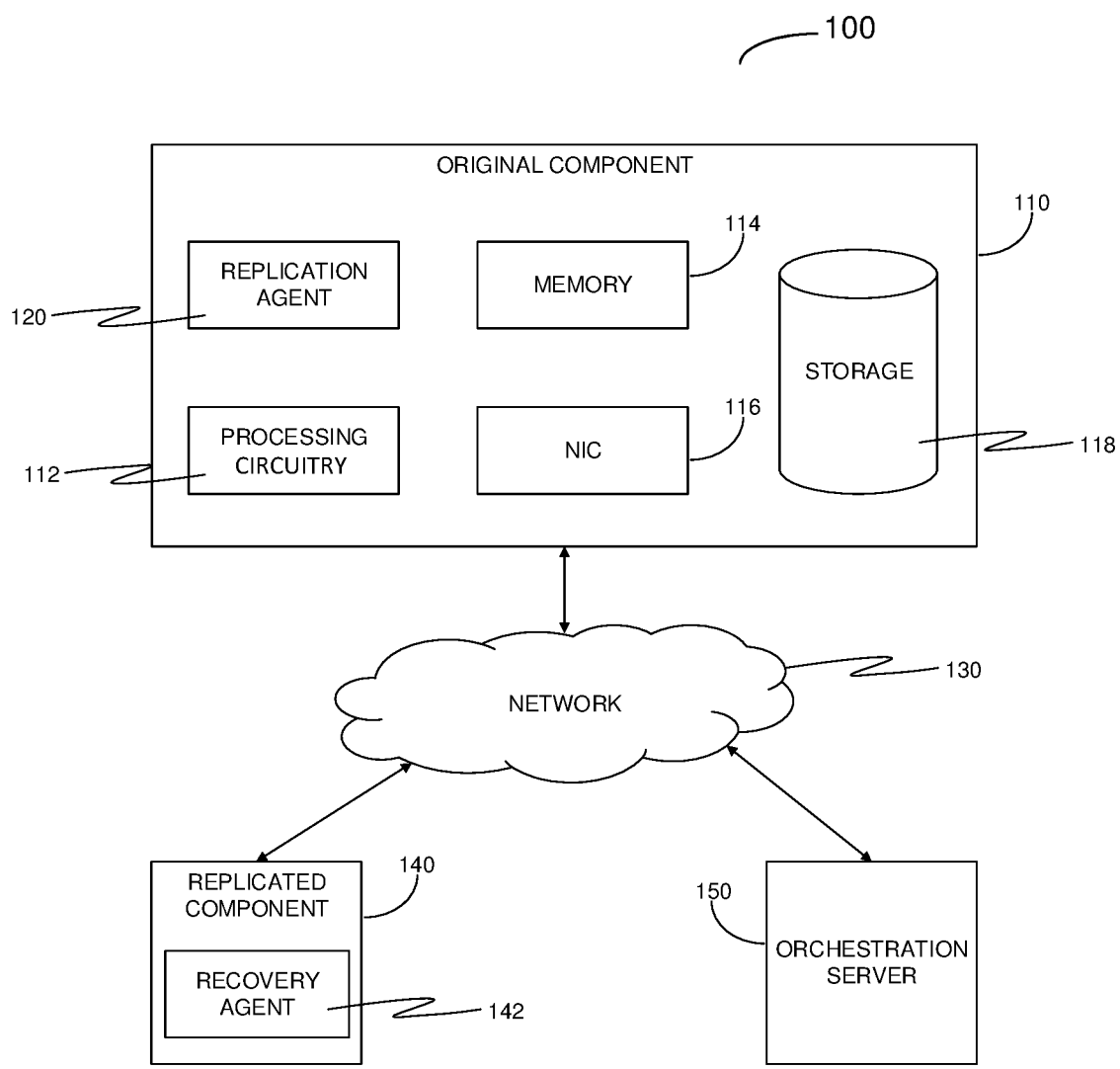
FIG. 1 is an example block diagram of a replication system, according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for replicating devices and systems in a cloud computing environment that detects write instructions directed at various storage devices. A monitoring agent appends metadata to each write instruction, generating a write packet. The write packet includes a packet identifier which allows a replicated storage to acknowledge which packets have been committed to storage. In some embodiments, when a confirmation is sent to the monitoring agent that a packet was committed to storage, the monitoring agent determines that all packets which have an identifier value lower than the committed packet were likewise committed to storage.

FIG. 1 is an example block diagram of a replication system 100, according to an embodiment. The replication system 100 may be implemented for backups, disaster recovery, testing components, and the like. A first networking environment may include a plurality of original components (OCs), such as OC 110. An OC 110 may be, for example, a web server, database server, load balancer, content delivery network service, and the like. The OC 110 includes a processing circuitry 112, a memory 114, a network interface controller (NIC) 116, a storage 118, and a replication agent 120.

The replication agent 120 is a software component which may run, for example, from the memory 114. The replication agent 120 is configured to detect write instructions directed to the storage 118. In some embodiments, an OC 110 may include a plurality of storage devices 118, any of which can be monitored by a replication agent 120.

The NIC 116 provides connectivity to a network, such as network 130. In an embodiment, the network 130 is configured to provide connectivity of various sorts, including but not limited to, wired or wireless connectivity, including, for example, local area network (LAN), wide area network (WAN), metro area network (MAN), worldwide web (WWW), Internet, and any combination thereof, as well as cellular connectivity.

The network 130 further provides connectivity to a replicated component 140, and an orchestration server 150. The orchestration server 150 is configured to initiate components in a second networking environment (not shown), which may include a cloud based computing environment. A portion of the components may be replications of original component 110 from the first networking environment. In an embodiment, the original components 110 are in a first cloud based computing environment, and the replicated components 140 are in a second cloud based computing environment. The replication agent 120 are further configured to send write instructions to the replicated component 140, which corresponds to the original component 110. The replicated component 140 may include any and all of the subcomponents (not shown) of the original component 110. In particular, the replicated component 140 should include a replicated storage (not shown) which corresponds to the original storage 118.

A recovery agent 142 receives the write instructions from the replication agent 120 of the original component 110. In theory, the network 130 would provide consistently reliable end-to-end communication. However, in reality this is often not the case, as various network failures may occur. It is therefore important to know at what state the sent write instructions were in when received by the replicated component 140. This can include, for example, when a write instruction was sent by the replication agent 120, but not received by the recovery agent 142. As another example, a write instruction can be sent from the replication agent 120 and successfully received by the recovery agent 142, but an acknowledgement sent from the recovery agent 142 was not received by the replication agent 120.

In both examples, the replication agent 120 would not be able to determine if the write instruction must be resent. This is especially important for maintaining a replicated disk which is consistent with the original disk 118. In some embodiments, the recovery agent 142 is installed on the orchestration server 150, or on another machine or component of the second computing environment.

Figure 2:
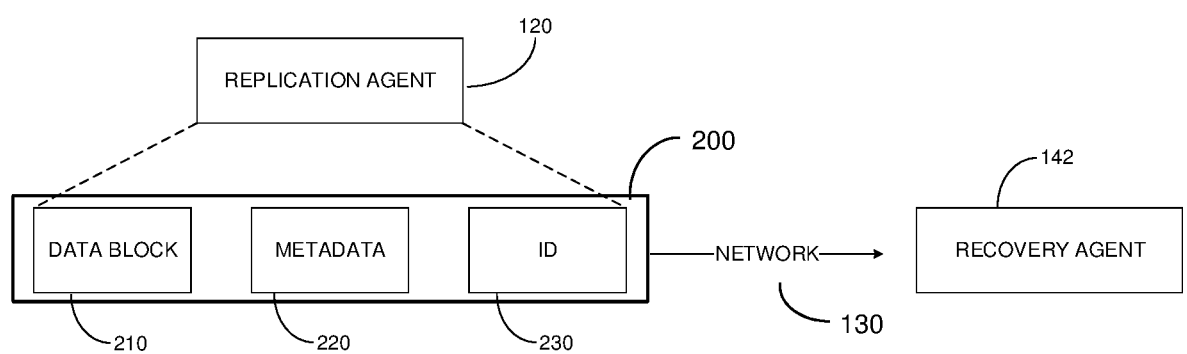
FIG. 2 is a schematic diagram of communication between a replication agent and a recovery agent, according to an embodiment.

FIG. 2 is a schematic diagram of communication between a replication agent 120 and a recovery agent 142, according to an embodiment. A replication agent 120 monitors one or more storage devices, e.g., storage device 118 of FIG. 1, each implemented on an original component, e.g., original component 110 of FIG. 1. Upon detecting a write instruction on the original component 118, the replication agent 120 generates a write packet 200.

The write packet 200 includes metadata 220 of a data block 210, and a write packet identifier (ID) 230. In some embodiments, the write packet 200 further includes the data block 210 itself. The ID 230 may be a unique ID, or an ID that may be reused. An ID 230 may be an alphanumeric code, a signature of the data block 210, and the like. In some embodiments, a write packet 200 may include a plurality of data blocks, and have one or more IDs, such that each ID corresponds to at least one data block. In an embodiment, the IDs are serial (or otherwise consecutive), such that when the system receives a notification that write packet 'n' is committed, where 'n' is an integer equal to or greater than 1, it is understood that all write packets having a serial ID smaller than 'n' are committed to storage. Write packets are stored in a queue (not shown), which may be implemented, for example, in a memory 114, and sent periodically to the recovery agent 142 over the network 130.

The recovery agent 142 may likewise store write packets in a queue (not shown), implemented, for example, in a memory of the replicated component, and instruct a storage to perform the write instructions therefrom. The recovery agent 142 may send an acknowledgement to the replication agent 120, e.g., over the network 130, to indicate that a write packet has been successfully written to the storage device. In certain embodiments, the recovery agent 142 may store in a completion queue the IDs of write packets which were committed to the replication storage (i.e., the write instructions were performed on the appropriate storage successfully) for a period of time.

In some embodiments, the replication agent 120 may store in a queue the metadata 220 and ID 230, and not the data block 210, in order to save memory space. The replication agent 120 may be configured to determine, for each write packet 200, an expected acknowledgement time. If an acknowledge message is not received from the recovery agent 142 within a time limit, the replication agent 120 may send the replication agent 142 a write confirmation request to confirm receipt. The time limit may be static, dynamic, or adaptive.

The write confirmation request may include the ID 230 of the write packet 200, to determine if the write instruction was executed by the replicated component. The recovery agent 142 may perform a check on the completion queue to determine if the ID 230 is present therein. If not, the recovery agent 142 may request from the replication agent 120 to resend the write packet. If the replication agent 120 did not store the data block 210 in memory, the data block 210 may be retrieved from the original storage 118 by accessing the associated metadata 220, which may include the logical address of the data block 210 within the original storage 118. In an embodiment, the acknowledgement is sent to the replication agent in response to receipt of a successful snapshot taken of the replicated disk.

Figure 3:
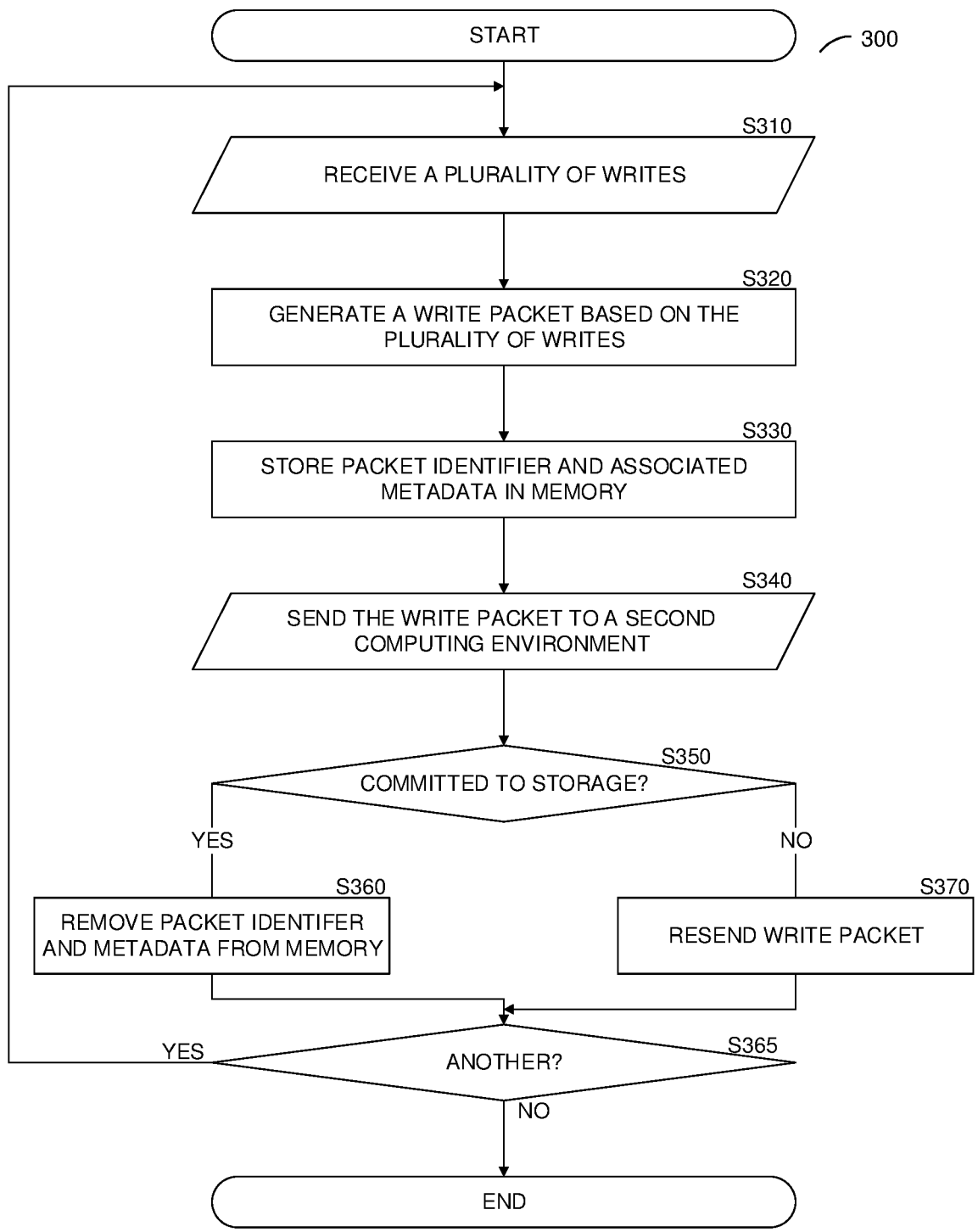
FIG. 3 is an example flowchart illustrating a method for disk replication over a network with network failover, according to an embodiment.

FIG. 3 is an example flowchart 300 illustrating a method for disk replication over a network with network failover, according to an embodiment.

At S310, a plurality of write instructions for a first storage device is received, e.g., from a replication agent installed on a first machine. The first machine, or original component, is in a first computing environment. Each write instruction includes a data block, a block address in which to write the data block, and associated metadata.

At S320, a write packet is generated, e.g., by the replication agent, and may include at least one write instructions, metadata associated with at least one data block, and at least one packet identifier. The packet identifier (ID) may be a unique ID, or an ID that may be reused. An ID may be an alphanumeric code, a signature of at least one data block, and the like. In an embodiment, the write packet may further include the at least one data block as well.

At S330, the packet identifier and associated metadata are stored, e.g., in a cache or memory connected to the replication agent, such as memory 114 of FIG. 1. In some embodiments, the entire write packet, including the at least one data block, is stored in the memory. In other embodiments, e.g., where it is advantageous to conserve memory space, storing the packet identifier and associated metadata is sufficient, as the metadata may point to the block addresses on the original component of the at least one data block from which they can be retrieved. While this operation may result in higher latency, the memory conservation may warrant such a scheme in certain circumstances.

At S340, the write packet is sent to a second computing environment for storage, for example a storage in a replicated component (RC), such as RC 140 of FIG. 1.

At S350, a check is performed to determine if the write packet was successfully committed to storage in the second computing environment. If so, execution continues at S360; otherwise execution continues at S370. A determination is made, for example, by receiving an acknowledgment from the second computing environment (for example from a recovery agent) within a predefined period of time. If no acknowledgement was received with the period of time, the replication agent may assume the write packet was not committed to storage.

At S360, the packet identifier and the associated metadata are removed from the memory in response to receiving a notification that the write packet is committed to storage in the second computing environment. In embodiments where the data blocks are stored in the memory until acknowledgement is received, they are likewise removed.

At S365, the replication agent determines if additional write instructions should be sent, if so, execution continues at S310, otherwise execution terminates.

At S370, the write packet is resent in response to not receiving an acknowledgement, e.g., from the second computing environment, that the write packet was successfully committed to storage. In some embodiments, the replication agent may retrieve the data blocks of the write packet from the original storage based on the block addresses stored as metadata in the memory. In some embodiments, execution can continue here at S365, or at S350.

Figure 4:
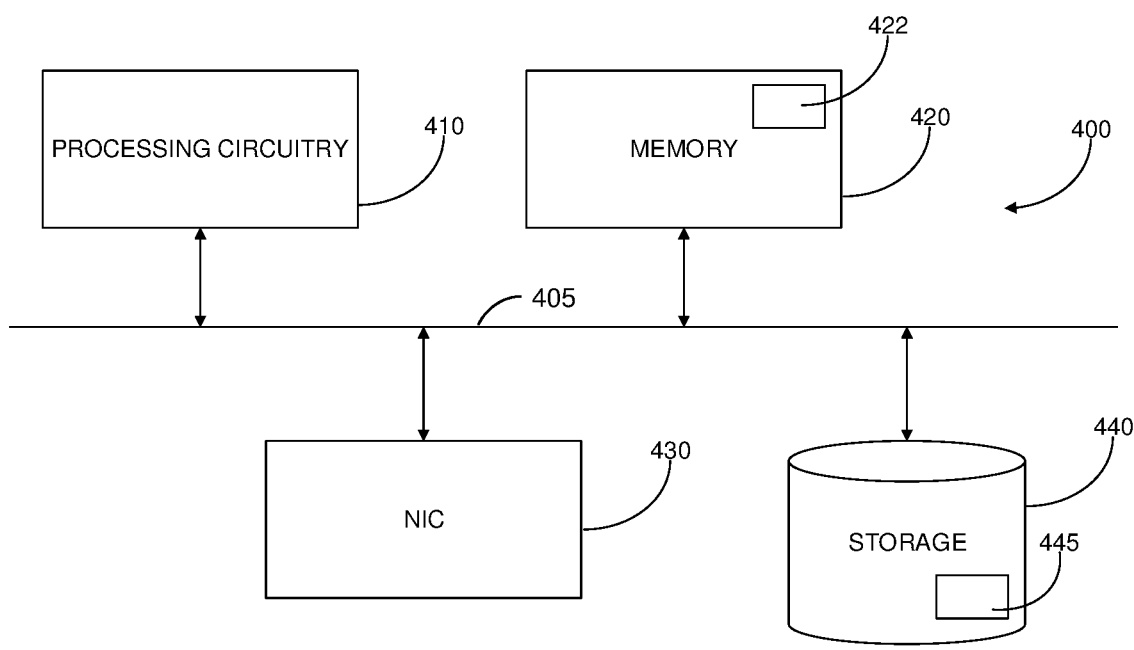
FIG. 4 is an example block diagram of a replication server, according to an embodiment.

FIG. 4 is an example block diagram of a replication server 400, according to an embodiment. The server 400 includes at least one processing circuitry 410, for example, a central processing unit (CPU). In an embodiment, the processing circuitry 410 is, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry 410 is coupled via a bus 405 to a memory 420.

The memory 420 may include a memory portion 422 that contains instructions that when, executed by the processing circuitry 410, performs the method described herein in more detail herein. The memory 420 may be further used as a working scratch pad for the processing circuitry 410, a temporary storage, and others, as the case may be. The memory 420 may be a volatile memory such as, but not limited to random access memory (RAM), or non-volatile memory (NVM), such as, but not limited to, flash memory. The memory 420 may further include a memory portion containing at least one identifier of write packets, associated metadata, and in some embodiments associated data blocks. The processing circuitry 410 may be coupled to a network interface controller (NIC) 430 for providing connectivity to the replication server 400.

The processing circuitry 410 may be further coupled with a storage 440. Storage 440 may be used for the purpose of holding a copy of the method executed in accordance with the disclosed technique. Storage 440 may include storage portion 445 containing at least one write packet committed to the storage. The processing circuitry 410 or the memory 420 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions cause the processing circuitry 410 to perform the various functions described in further detail herein. The replication server 400 is an exemplary machine which may serve as the orchestration server in some embodiments, and as the replicated component in others.

Throughout this disclosure, the terms storage device, storage, disk, and storage disk may be used interchangeably, all referring to a storage device which is a non-volatile type of computer memory, such as hard disk drives, solid state drives, etc.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for disk replication over a network with network failover, comprising:
    generating a first write packet when a write instruction is detected from a first computing environment, where the first write packet includes: metadata associated with a data block, and a packet identifier;
    storing the first write packet in a cache;
    sending the first write packet from the cache to a second computing environment for storage; and
    determining that the first write packet has been successfully stored in the second computing environment based on receipt of an acknowledgement sent responsive to a successful snapshot being taken of the storage in the second computing environment; and
    removing a plurality of write packets from the cache in response to determining that the first write packet was successfully stored in the second computing environment, wherein the packet identifier of the first write packet is larger than each other serially consecutive packet identifier of the other write packets of the plurality of write packets.

2. The method of claim 1, further comprising:
    determining that the first write packet was not successfully stored in the second computing environment; and
    resending the first write packet.

3. The method of claim 2, wherein determining that the first write packet was not successfully stored in the second computing environment comprises:
    detecting that an acknowledgement has not been received for the packet identifier of the first write packet within a predetermined time limit.

4. The method of claim 3, further comprising:
    identifying one or more data blocks of the first write packet based on the packet identifier; and
    resending the one or more data blocks to the second computing environment.

5. The method of claim 1, wherein the first write packet further includes at least one data block.

6. A non-transitory computer readable medium having stored thereon instructions for causing a processing circuitry to perform a process, the process comprising:
    generating a first write packet when a write instruction is detected from a first computing environment, where the first write packet includes: metadata associated with a data block, and a packet identifier;
    storing the first write packet in a cache;
    sending the first write packet from the cache to a second computing environment for storage;
    determining that the first write packet has been successfully stored in the second computing environment based on receipt of an acknowledgement sent responsive to a successful snapshot being taken of the storage in the second computing environment; and
    removing a plurality of write packets from the cache in response to determining that the first write packet was successfully stored in the second computing environment, wherein the packet identifier of the first write packet is larger than each other serially consecutive packet identifier of the other write packets of the plurality of write packets.

7. The non-transitory computer readable medium of claim 6, wherein the process further comprises:
    determining that the first write packet was not successfully stored in the second computing environment; and
    resending the first write packet.

8. The non-transitory computer readable medium of claim 7, wherein determining that the first write packet was not successfully stored in the second computing environment comprises:
    detecting that an acknowledgement has not been received for the packet identifier of the first write packet within a predetermined time limit.

9. The non-transitory computer readable medium of claim 8, wherein the process further comprises:
    identifying one or more data blocks of the first write packet based on the packet identifier; and
    resending the one or more data blocks to the second computing environment.

10. The non-transitory computer readable medium of claim 6, wherein the first write packet further includes at least one data block.

11. A system for disk replication over a network with network failover, comprising:
    a processing circuitry; and
    a memory storing instructions that, when executed by the processing circuitry, cause the system to:
        generate a first write packet when a write instruction is detected from a first computing environment, where the first write packet includes: metadata associated with a data block, and a packet identifier;
        store the first write packet in a cache;
        send the first write packet from the cache to a second computing environment for storage;
        determine the first write packet has been successfully stored in the second computing environment based on receipt of an acknowledgement sent responsive to a successful snapshot being taken of the storage in the second computing environment; and
        remove a plurality of write packets from the cache in response to determining that the first write packet was successfully stored in the second computing environment, wherein the packet identifier of the first write packet is larger than each other serially consecutive packet identifier of the other write packets of the plurality of write packets.

12. The system of claim 11, wherein the memory further includes instructions that, when executed by the processing circuitry, cause the system to:
    determine that the first write packet was not successfully stored in the second computing environment; and
    resend the first write packet.

13. The system of claim 12, wherein the memory further includes instructions that, when executed by the processing circuitry, cause the system to:

detect that an acknowledgement has not been received for the packet identifier of the first write packet within a predetermined time limit.

14. The system of claim 13, wherein the memory further includes instructions that, when executed by the processing circuitry, cause the system to:
   identify one or more data blocks of the first write packet based on the packet identifier; and
   resend the one or more data blocks to the second computing environment.

15. The system of claim 11, wherein the first write packet further includes at least one data block.

* * * * *